United States Patent
Little

[15] 3,699,847
[45] Oct. 24, 1972

[54] COOLED HYDRAULIC SYSTEM
[72] Inventor: Jane Little, Long Beach, Calif.
[73] Assignee: McDonnell Douglas Corporation
[22] Filed: Feb. 4, 1971
[21] Appl. No.: 112,712

[52] U.S. Cl.................91/411 R, 92/1, 60/DIG. 5, 60/52 HC
[51] Int. Cl.................................F15b 11/16
[58] Field of Search.................91/411 R; 92/1, 144; 60/DIG. 5, 52 WW

[56] References Cited

UNITED STATES PATENTS

| | | |
|---|---|---|
| 1,566,995 | 12/1925 | Standerwick............60/51 UX |
| 2,417,256 | 3/1947 | Kremiller............60/54.5 R X |
| 2,659,204 | 11/1952 | Conway et al...........60/52 HC |
| 3,296,936 | 1/1967 | Wess et al. ...........91/411 R X |

Primary Examiner—Edgar W. Geoghegan
Attorney—Walter J. Jason, Donald L. Royer and George W. Finch

[57] ABSTRACT

A hydraulic system which includes bypass restrictors at the extremities thereof to produce a predetermined flow of hydraulic fluid in selected hydraulic lines. The predetermined flow of hydraulic fluid transfers heat generated in the system throughout the system so that the heat loss along the hydraulic lines is sufficient to maintain the temperature of the hydraulic fluid below a predetermined temperature.

13 Claims, 5 Drawing Figures

INVENTOR.
JANE LITTLE
BY George W. Finch
-ATTORNEY-

COOLED HYDRAULIC SYSTEM

BACKGROUND OF THE INVENTION

In all hydraulic systems such as those used on aircraft, pumps, rotating devices, aircraft environment and other unavoidable sources provide heat energy which is picked up by the hydraulic fluid passing through the system to raise the temperature thereof. Since hydraulic fluids and the packings utilized in hydraulic systems deteriorate when subjected to excessive heat, existing aircraft must employ means to transfer heat away from the hydraulic system to keep the temperature of the hydraulic fluid therein below a predetermined point.

The heat transfer means heretofore utilized on aircraft have included heat exchangers which transfer heat from the hydraulic fluid to the fuel in the fuel tanks and finned hydraulic lines which dissipate heat from the hydraulic fluid to the ambient air. Unfortunately, both of these heretofore known cooling means have safety and operational disadvantages which become more critical as the size of the aircraft and/or its expected operational efficiency increases. For example, when the hydraulic fluid is cooled by means of fluid-to-fuel heat exchangers, serious operational problems are encountered since the amount of heat that can be transferred is related to the quantity of fuel available for cooling. This means that either a quantity of fuel must be made unusable or the pilot must constantly be careful not to run particular fuel tanks dry. Since the most severe hydraulic fluid temperature problems usually occur when the aircraft is on the ground, it is also possible that during ground maintenance testing or taxi to the terminal after a flight, the aircraft will not have sufficient fuel in the tanks to assure that the maximum temperature of the hydraulic fluid is not exceeded. In addition, such fluid-to-fuel heat exchangers are in some ways dangerous since it is always possible through a faulty heat exchanger to mix hot hydraulic fluid into the fuel, a mixture which, in some circumstances, can cause engine damage or failure. Finned hydraulic lines on the other hand have the disadvantage of being very heavy in proportion to the amount of heat they can dissipate.

BRIEF SUMMARY OF THE INVENTION

The present hydraulic system solves the problem of hydraulic system cooling by providing properly sized bypass cooling restrictors strategically located between pressure lines and return lines preferably at the extremities of the hydraulic system. The use of bypass cooling restrictors enables about a 10 to 1 reduction in cost and weight in comparison to standard fluid-to-fuel heat exchangers while at the same time the restrictors are more reliable since they are in no way dependent upon the quantity of fuel available for cooling. The weight saved by using restrictors in place of finned hydraulic lines is even greater than 10 to 1.

Generally, aircraft hydraulic systems include one or more hydraulic pumps, hydraulic actuators, and pressure and return lines therebetween through which the hydraulic fluid flows. Pumping losses as well as other work wasting mechanisms cause some of the energy within the system to be converted into heat which causes the temperature of the hydraulic fluid to rise. By placing bypass restrictors of a predetermined size between the pressure and the return lines at selected extremities of the hydraulic system, the present invention utilizes the hydraulic pressure piping network and the return piping network from the actuators to the pump or pumps to dissipate heat energy into the air and the surrounding aircraft structure and to thereby hold the temperature of the hydraulic fluid within the system well below its critical temperature.

It should be pointed out that heretofore it has been well recognized in the hydraulic art that leakage anywhere in the hydraulic system is a source of heat. That is, leakage can be equated to unwanted heat. The inventor has found, however, contrary to what would be expected, that by inducing leakage very carefully at the extremities of the hydraulic system, the amount of heat dissipated by the hydraulic lines of such a system far exceeds the increased heat generated by the leakage. Therefore, the temperature of the fluid actually decreases due to the leakage flow.

It is therefore an object of the present invention to provide a hydraulic system in which the temperature of the hydraulic fluid therein is held below a predetermined point.

Another object of the present invention is to eliminate the necessity for fluid-to-fuel heat exchangers in aircraft.

Another object of the present invention is to eliminate the need for adding additional heat dissipating area to the hydraulic lines of a hydraulic system.

Another object of the present invention is to utilize the piping required to transfer hydraulic fluid in a hydraulic system as a radiator to reduce the temperature of the hydraulic fluid contained therein.

Another object is to provide a highly reliable hydraulic system which requires a minimum of maintenance.

Another object is to provide an aircraft hydraulic system which is independent of other aircraft systems as far as temperature regulation is concerned.

Another object is to substantially reduce the weight of cooling means for a hydraulic system.

Another object is to provide means to cool an existing hydraulic system with very little modification thereto.

These and other objects and advantages of the present invention will become apparent after considering the following detailed specification which covers a preferred embodiment thereof in conjunction with the accompanying drawings wherein:

DESCRIPTION OF THE SHOWN EMBODIMENTS

Figure 1:
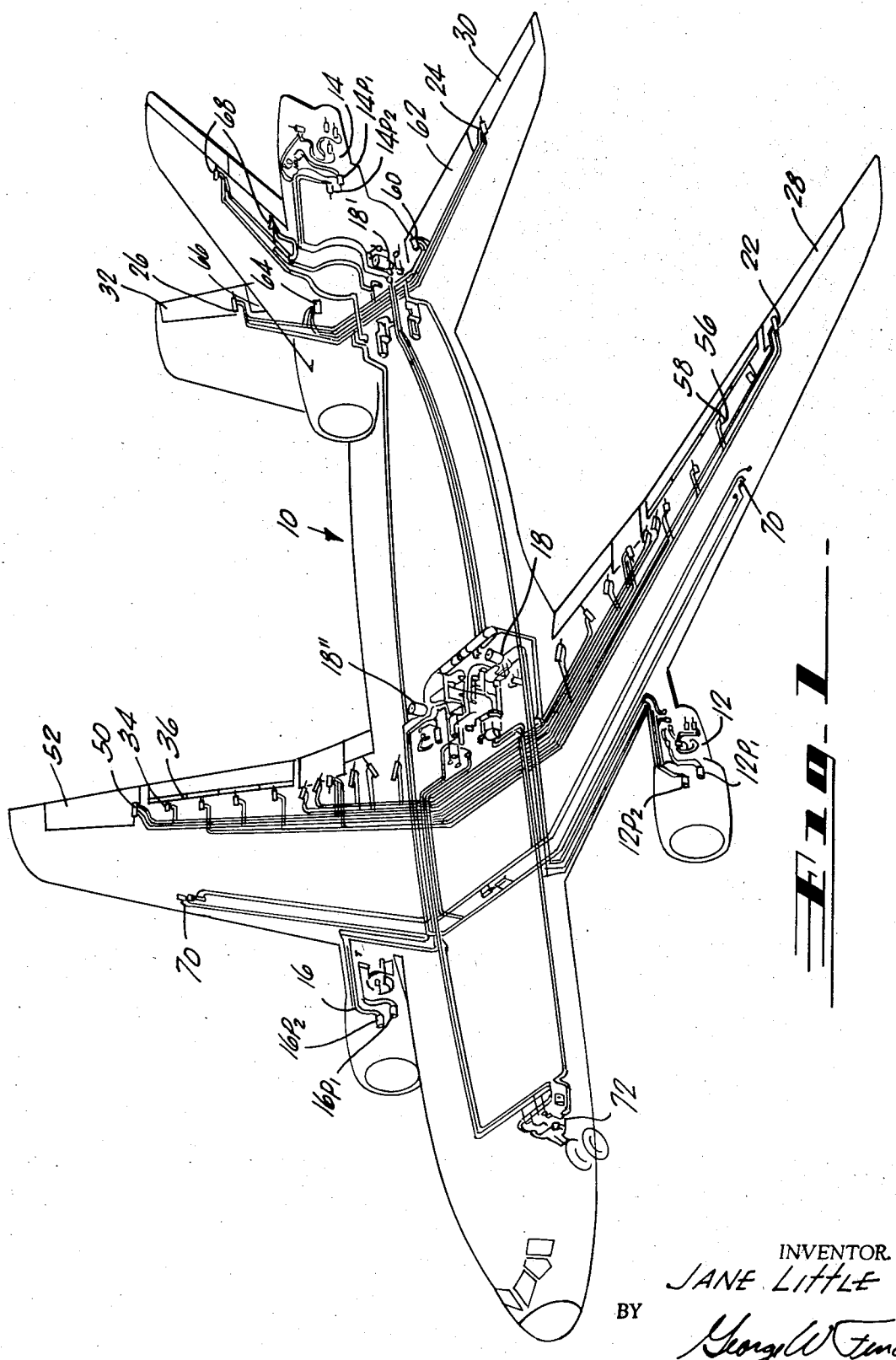
FIG. 1 is a phantom view of a DC-10 (trademark of McDonnell Douglas Corporation) aircraft showing the more important portions of three hydraulic systems thereof.

Referring to the drawings more particularly by reference numbers, number 10 in FIG. 1 refers to an aircraft having propulsion engines 12, 14 and 16. With the aircraft type shown, DC-10, there are three continuously operating, separate and completely independent closed circuit hydraulic systems. Each system includes at least one pair of hydraulic pumps driven by one of the propulsion engines 12, 14 or 16.

Figure 3:
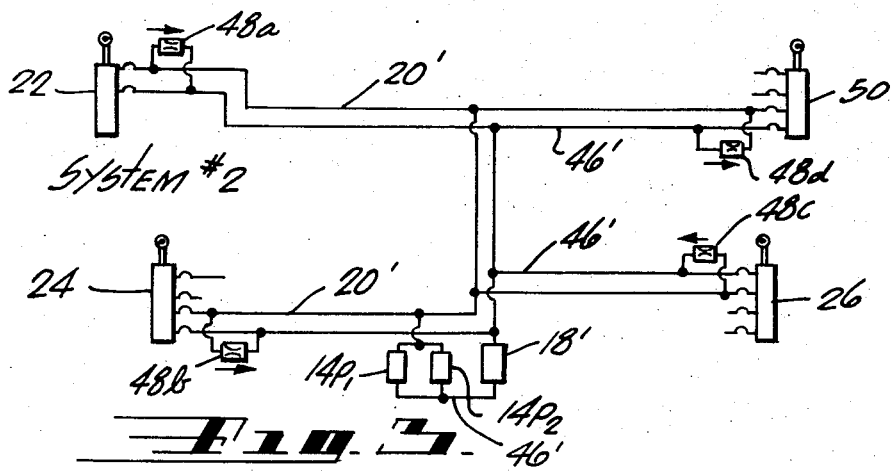
Figure 4:
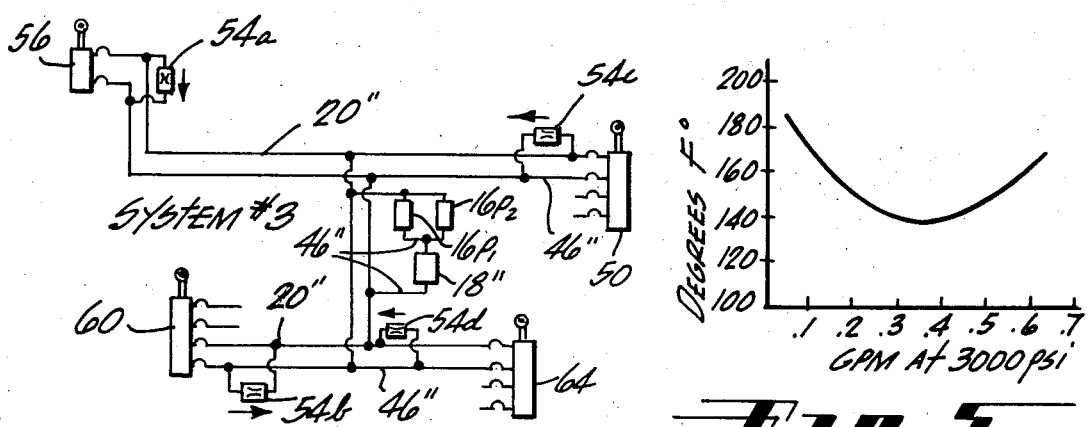

To follow the conventional system of identifying engines and hydraulic systems, the hydraulic system associated with engine 12 will be referred to as System No. 1, System No. 2 will be associated with engine 14 and System No. 3 with engine 16. The portions of the hydraulic systems No. 1, No. 2, and No. 3 pertinent to the present invention are shown in FIGS. 2, 3 and 4 respectively.

Figure 2:
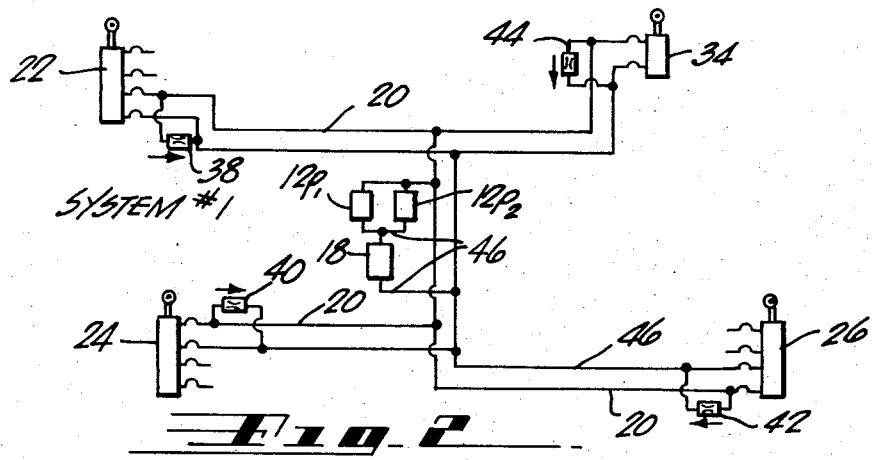
FIGS. 2, 3 and 4 are diagrams of the pertinent portions of the three hydraulic systems of the DC-10 aircraft which are typical of expected embodiments of the present invention.

Taking System No. 1 of FIG. 2 as a typical example, the engine driven pumps $12P_1$ and $12P_2$ pump hydraulic fluid from a reservoir 18 into the pressure side of the hydraulic system indicated by lines 20. In System No. 1, the pressure lines 20 are connected to dual hydraulic actuators 22, 24 and 26 which operate to move the left outboard aileron 28, the left outboard elevator 30 and the right outboard elevator 32, respectively. System No. 1 also supplies hydraulic fluid to actuator 34 which actuates the right hand No. 4 spoiler 36 of the aircraft 10. System No. 1 also supplies hydraulic fluid to many other actuators throughout the aircraft which may include those that control the landing gear and the flaps. However, in this specific example only the abovementioned actuators are pertinent since they are connected to the system by the longest hydraulic lines which provide the most area for heat dissipation. Adjacent to or included with each of the actuators 22, 24, 26 and 34 are specially sized bypass flow restrictors 38, 40, 42 and 44 respectively, which allow the hydraulic fluid to flow from the pressure lines 20 to the return lines 46 of the system. In the present invention the pressure lines 20 and the return lines 46 serve as the principle heat dissipating means for the hydraulic system.

System No. 2 incorporates bypass flow restrictors 48a, 48b and 48c adjacent or in conjunction with actuators 22, 24 and 26 and in addition, includes a restrictor 48d adjacent actuator 50 which operates the right outboard aileron 52 of the aircraft 10. Like in System No. 1, the above-stated locations for restrictors are chosen because they are connected to the pumps $14P_1$ and $14P_2$ and the reservoir 18' of System No. 2 by the longest pressure and return lines 20' and 46' available. Of course, in a multihydraulic system aircraft like the DC-10, not every system extends to the outer extremities of the aircraft. This, however, has not proven to be a problem as can be seen with reference to System No. 3.

System No. 3 incorporates a restrictor 54c between the pressure and return lines 20'' and 46'' adjacent actuator 50 while the other restrictors in the system 54a, 54b, and 54d are located respectively adjacent actuator 56 which operates the left hand No. 3 spoiler 58, actuator 60 which operates the left hand inboard elevator 62 and actuator 64 which operates the right hand inboard elevator 66. As can be seen in FIG. 1, the longest lengths of the pressure hydraulic lines 20'' between the pumps $16P_1$ and $16P_2$ and the restrictors; and the longest lengths of the return lines 46'' between the restrictors and the reservoir 18'' are shorter in System No. 3 than in the other systems, yet test results have shown that adequate cooling is still available.

The size and location of the bypass flow restrictors does greatly influence the amount of cooling, however, and it is possible that different locations on other aircraft adjacent the rudder actuators 68, the slot actuators 70, or the landing gear 72 might prove to be better. It should also be obvious that the action of the separate bypass restrictors can be included in the design of actuators employed in a hydraulic system so that separate connections to the lines of the hydraulic system for the bypass restrictors are eliminated.

Figure 5:
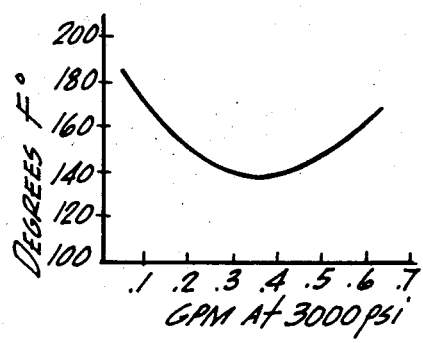
FIG. 5 is a graph of hydraulic fluid temperature vs. controlled leakage to illustrate the principles of the present invention.

In the DC-10 type aircraft, both computer and actual test results have shown that 0.25 GPM restrictors adjacent the aileron and spoiler actuators and 0.20 GPM restrictors adjacent the elevator actuators provide enough cooling to reduce the temperature of the hydraulic fluid approximately 50° F on a 75° F day with the engines 12, 14 and 16 running at ground idle speed. The above restrictor sizes were chosen since they are smaller than the size for optimum cooling. This is clear with reference to FIG. 5 which is a graph for System No. 3 of stabilized reservoir temperature in ° F versus restrictor size for the restrictors adjacent the aileron and spoiler actuators with proportionately smaller sized restrictors adjacent the elevator actuators. As can be seen by reference to FIG. 5, as the restrictors wear thereby increasing the bypass flow therethrough, the cooling characteristics of the system will actually get better and remain that way until the restrictors are worn to such an extent that they pass more than twice the original flow. Additional flow thereafter will then cause too much heat input and the restrictors will have to be replaced. Since restrictors of the type used in the present invention, which are available from Crissair Inc. of El Segundo, Calif., have relatively slow wear rates, it is anticipated that the restrictors will need replacement very seldom, if at all, over the lifetime of the aircraft.

It should be realized that the above described systems have proven to be the optimum systems for one specific aircraft and that other aircraft having different configurations and hydraulic systems may require more or less restrictors located at various locations throughout the systems. However, in all of these systems the flow inducing means will operate to cool the hydraulic system most effectively if they are located closely adjacent to or incorporated in those hydraulic actuators which are either generally located at the extremities of the hydraulic system or located so the induced hydraulic flow is directed through piping where there is substantial air circulation around the piping to dissipate the heat.

Thus there has been shown and described a novel hydraulic system which, through the use of carefully sized and strategically located flow inducing means utilizes the pressure and return lines thereof as radiators to cool the system and thereby fulfills all of the objects and advantages sought therefor. Many changes, modifications, variations and other uses and applications of the subject hydraulic system will, however, become apparent to those skilled in the art after considering this specification together with the accompanying drawings. All such changes, modifications, variations and other uses and applications which do not depart from the spirit and scope of the invention are deemed to be covered by the invention which is limited only by the claims which follow:

What is claimed is:

1. A hydraulic system containing a relatively incompressible hydraulic medium and having a pressure line, a return line, means to pump the medium from the return line to the pressure line and at least one actuator to use the energy of the medium in the pressure line and return the medium to the return line, the improvement comprising:

bypass means connected between the pressure and return lines which allow a predetermined flow of medium between the pressure and return lines, whereby a predetermined flow of medium is assured in a portion of the pressure and return lines, which flow carries heat which is dissipated along the pressure and return lines, said heat being dissipated along the pressure and return lines being greater than the heat injected into said system by the pumping means in pumping said predetermined flow to assure that said hydraulic medium remains below a predetermined temperature.

2. The system defined in claim 1 wherein said bypass means are sized to allow a flow of medium which is less than the flow for causing minimum temperatures of the hydraulic medium within the operating system so that as said bypass means wear and allow more flow, the temperatures of the hydraulic medium within the system become lower.

3. The system defined in claim 1 wherein said bypass means are located adjacent the actuator so that a large proportion of the pressure and return lines are used to dissipate heat.

4. The system defined in claim 1 having a plurality of actuators and pressure and return lines between the actuators and the pump means, said bypass means being connected adjacent selected actuators chosen because the pressure and return lines connected thereto have relatively high heat dissipation characteristics.

5. In a hydraulic system having undesired heat injected into the hydraulic medium by pumping losses therein:

means to induce a continuous predetermined flow of hydraulic medium in selected lines of said system so that more of said heat is dissipated from said medium by said selected lines than is produced by the heat injected into said medium because of said predetermined flow.

6. The system defined in claim 5 wherein said flow inducing means include a bypass restrictor.

7. The system defined in claim 5 wherein said flow inducing means include a hydraulic actuator incorporating means to assure a predetermined medium leakage therethrough.

8. A hydraulic system for an aircraft, said system including:

a supply of hydraulic fluid;
fluid distributing lines;
means to pump said hydraulic fluid from said supply into said fluid distributing lines at a predetermined pressure, said means injecting undesired heat into said fluid;
fluid return lines connected to said supply;
actuators connected to use said pressurized fluid in said fluid distributing lines and to return said fluid to said fluid return lines; and
means in communication with selected fluid distributing and fluid return lines to enable predetermined flows of fluid therethrough, said selected fluid distributing and fluid return lines being selected because of their ability to dissipate relatively more heat than the non-selected lines and said predetermined flows of fluid acting to transport said undesired heat in the fluid within said selected fluid distributing and fluid return lines so that more of said heat is dissipated therefrom than is generated by said pump means in pumping said predetermined flows.

9. The system defined in claim 8 wherein said selected fluid distributing and fluid return lines are those lines which extend most toward the extremities of the aircraft.

10. The system defined in claim 8 wherein said flow enabling means include:

means which tend to wear in operation and increase the flow enabled thereby, said flow enabling means being initially sized for a flow that produces less heat dissipation and a higher fluid temperature than is possible; whereby wear of said flow enabling means causes, up to a certain point, lower fluid temperatures in the system.

11. The system defined in claim 8 wherein selected actuators include said flow enabling means.

12. The system defined in claim 8 wherein said flow enabling means are bypass restrictors positioned adjacent selected actuators and connected between said fluid distributing lines and fluid return lines connected to said selected actuators.

13. A method of controlling the temperature of hydraulic fluid of an aircraft hydraulic system having a pressure and a return line comprising the step of:

inducing a predetermined continuous flow of the hydraulic fluid from the pressure line to the return line so that the fluid is transported through said lines and the heat is dissipated by the surface areas thereof to cool the fluid and maintain the temperature of the fluid below a predetermined temperature.

* * * * *